C. DU PEROW.
Harrow.

No. 198,538. Patented Dec. 25, 1877.

WITNESSES
Wm Webb
Philip J. Edmund.

INVENTOR
Charles Duperow
by attorney
Henry Beech

UNITED STATES PATENT OFFICE.

CHARLES DU PEROW, OF STRATFORD, ONTARIO, CANADA.

IMPROVEMENT IN HARROWS.

Specification forming part of Letters Patent No. 198,538, dated December 25, 1877; application filed March 27, 1876.

*To all whom it may concern:*

Be it known that I, CHARLES DU PEROW, of the town of Stratford, in the county of Perth, in the Province of Ontario, Canada, have invented certain new and useful Improvements in Harrows, of which the following is a full, clear, and exact description.

The nature of my invention relates to improvements in the construction of iron harrows, whereby each section acts independently of the others, every such section being attached separately to a draft-bar common to all the sections, by which means greater facility is obtained in harrowing ground encumbered by stones or stumps of trees.

It consists, also, in a special form of tooth, provided with a collar for greater strength and durability, and set angularly to the bar, in order to cut with greater ease.

Figure 1:
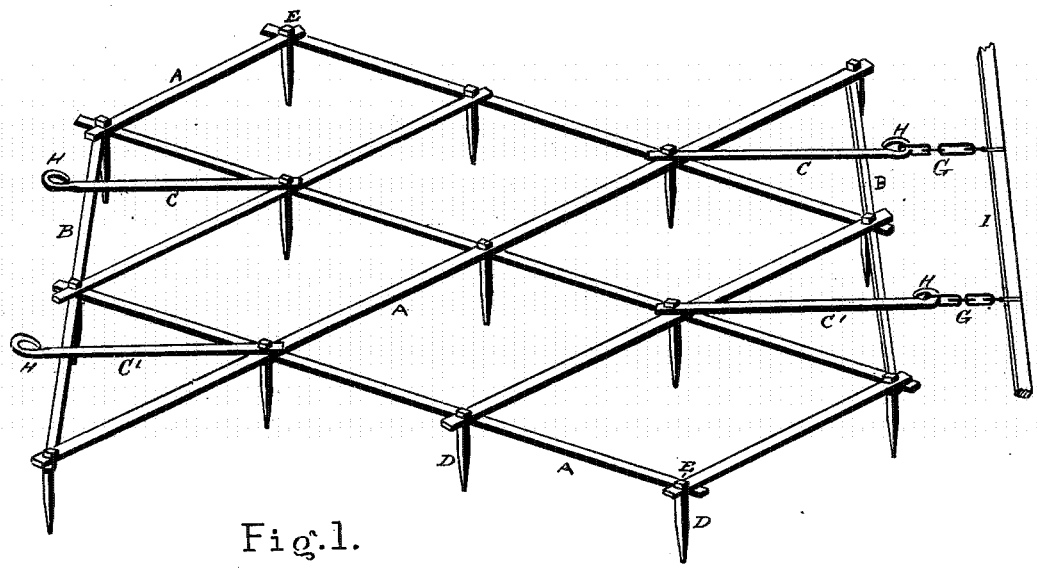
Figure 2:
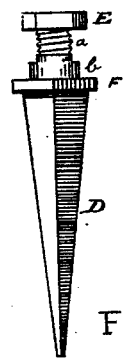
Figure 3:

Figure 1 is a perspective view of my invention. Figs. 2 and 3 are sketches of the teeth.

A A are flat or square wrought-iron bars, arranged diagonally, as shown, and connected at both ends to the cross-bars B B', as well as to the straight bars C C', by means of the heads $a$, Fig. 2, of the teeth D, which are received in suitable holes formed in said bars at their junction, and secured on top by nuts E. The under side of each tooth has a flange or collar, F, formed on it, which fits against the under side of bar, and acts as a brace and means of strength.

The teeth are made of square or round pointed iron, and set as shown in sketch, Fig. 3—*i. e.*, diagonally to the bar—in order to overcome resistance.

The shank end of the tooth, immediately above the collar F, is elliptical in shape, as shown at $b$, and the holes in bars of harrow are of similar shape, instead of being round, the object of this being to prevent the tooth from turning round when in use.

The sections of the harrow, whether two or more are used, are attached by the chains G to the hooks H on the ends of bars C C', without any other connections between them, and the said chains are hooked to a draft-bar, I, which is itself attached to the ordinary double-tree.

The advantages claimed by this form of construction are strength, simplicity, lightness of draft, and facility in passing obstructions, as well as greater ease in cutting.

I claim as my invention and desire to secure by Letters Patent—

In a harrow, the frame composed of the bars A, crossing each other at an angle of about sixty degrees, in combination with the head-bars B B' and two sets of draw-bars, C C', and the teeth D, having elliptical shank and corresponding socket, as specified.

CHARLES DU PEROW.

Witnesses:
  HENRY BEECH,
  PHILIP J. EDMUND.